May 16, 1944.    C. W. CRUMRINE    2,348,729

ANIMAL TRAP

Filed April 23, 1943

INVENTOR
Chester W. Crumrine
BY
Bean, Brooks, Buckley & Bean
ATTORNEYS

Patented May 16, 1944

2,348,729

UNITED STATES PATENT OFFICE 2,348,729

ANIMAL TRAP

Chester W. Crumrine, Irondequoit Township, Monroe County, N. Y.

Application April 23, 1943, Serial No. 484,185

12 Claims. (Cl. 43—99)

This invention relates to animal traps and particularly to automatic traps which are especially useful in the extermination of rodents.

Many prior art attempts have been made to provide trap devices with means for automatically resetting traps after an animal has been caught, as well as for removing the body of the animal from the region where it is initially trapped. The most frequently occurring of these prior devices depend generally upon the volition of the animal for movement from an initial zone, either under the urge of curiosity or in an endeavor to escape from the trap. According to the principles of the present invention the movements of the trapped animal after his initial entry into the trapping zone are fully controlled by the trapping means and are not dependent in any manner on voluntary action of the animal.

As will be seen from the following description of an exemplary embodiment of the invention, the mere presence of an animal at a predetermined point in a trapping zone initiates a cycle of operation which includes positively and forcibly moving the animal to a confined area where he is electrocuted, following which the body of the animal is automatically moved to a further zone to free the electrocution area for subsequent use on another animal. Immediately following the electrocution phase of the cycle of operation and as a part of the operation of removing the animal from the electrocution area the animal moving instrumentalities are automatically conditioned for forcibly moving another animal to the electrocution area upon entry of such other animal into the trapping zone.

The entire cycle of operation is short in duration and traps constructed according to the present invention are able to deal with conditions such as are encountered in highly infested areas. Extermination on a wholesale scale may be efficiently practiced.

The present invention is further characterized by the fact that the initial impulse which begins the trapping operation is of such nature as not to excite the suspicion of the animal and the succession of events following this impulse is carried out in such a manner and at such speed as to absolutely preclude the possibility of escape of the animal. The general trapping arrangement of the invention is, moreover, such that nothing in the trapping cycle is calculated to discourage other animals from subsequently entering the trap or to arouse their suspicion as to the nature of the device.

While a specific embodiment of the invention is illustrated in the drawing and described herein by way of example, it is to be understood that the broad principles of the invention are not limited thereto or otherwise than as defined in the appended claims. For instance, in place of the wire, cord or the like against which the animal impinges to initiate trap operation, there may be substituted any known means for closing an electric trap operating circuit by reason of the presence of an animal to be trapped.

Figure 1:
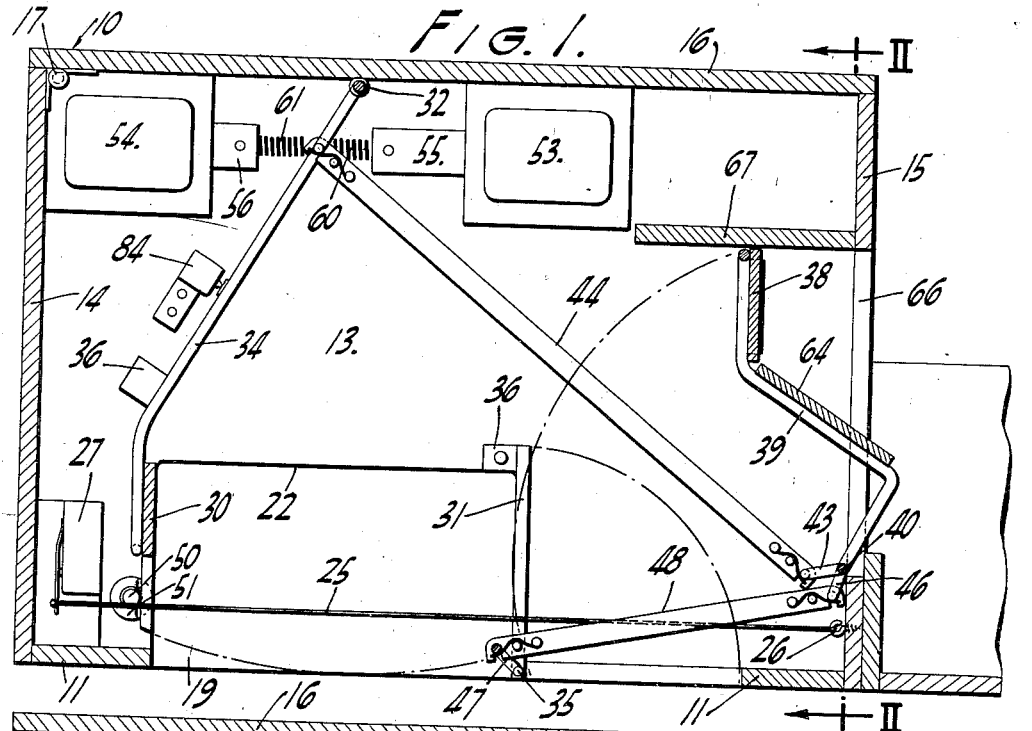
Fig. 1 is an elevational view of one form of apparatus constructed in accordance with the invention with a front casing wall thereof broken away to depict the interior arrangement of the device.

In the several figures of the drawing like characters of reference denote like parts and the numeral 10 designates generally a box-like casing having a bottom wall 11; front and rear walls 12 and 13, respectively; side walls 14 and 15; and a top closure wall 16 hinged to the side wall 14 as at 17. It will be noted that a portion of the bottom wall 11 is broken away to form a passageway 19, Fig. 1, and this clear passageway extends entirely from the front wall 12 to the rear wall 13, there being entranceways formed in these two walls at each end of the passageway 19. The entranceways in the walls 12 and 13 are designated 21 and 22 respectively and cooperate with the passageway 19 to provide a clear and generally uninterrupted zone which forms a mere continuation of the floor or other surface upon which the trap may be resting. It is during the passage of an animal through this zone that its freedom is abruptly arrested and the entire trapping and disposing cycle is begun and automatically continued to completion.

A fine cord or strand of wire 25 extends across the passage 19, preferably about centrally thereof, its one end being anchored to side wall 15 as at 26 and its other end secured to the movable contact element of a normally open electric switch 27. The cord 25 is disposed at a height at which it is best calculated to be impinged against by an animal attempting to traverse the passageway 19 and its initial tension and the tension of the switch contact member are so proportioned that extremely light pressure against the cord 19 suffices to momentarily close the switch 27. Such closure institutes a cycle of operation which comprises successively removing the animal forcibly from the passageway 19, electrocuting the animal, and further moving the animal body either to a final receiving zone or to a point outside of the trap proper.

Figure 2:
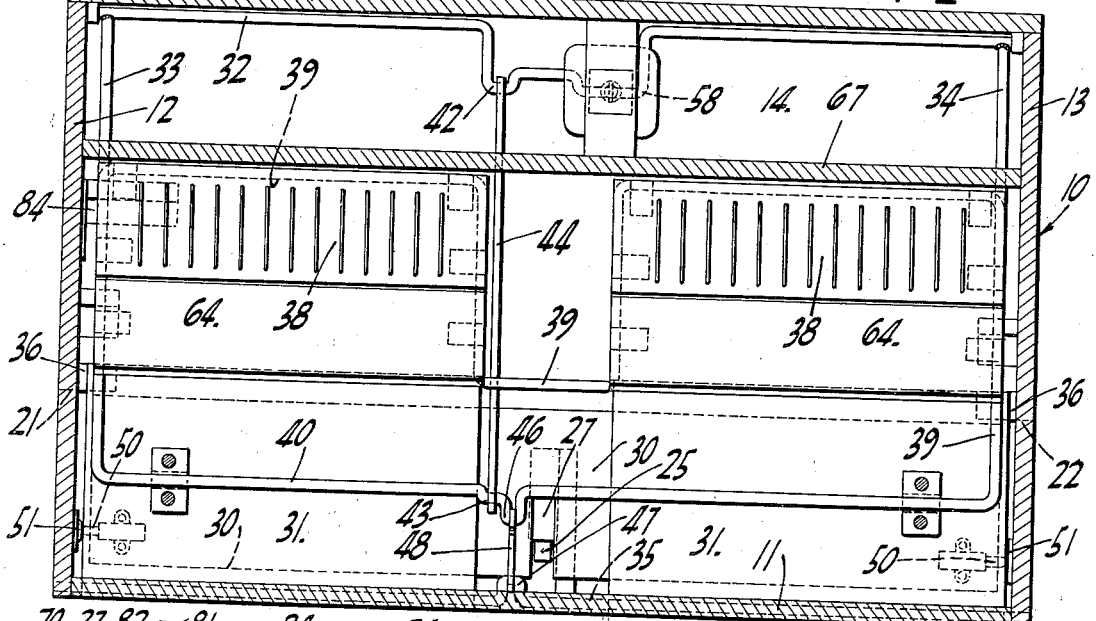
Fig. 2 is a cross-sectional view taken approximately on the line II—II of Fig. 1.
Figure 3:
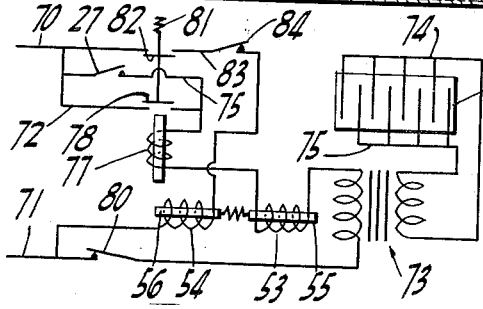
Fig. 3 is a schematic view of the electrocution portion of the device including a wiring diagram illustrating the electrical relationship of the operating parts of the trap.

The mechanical means for effecting these ends will be first described, following which the electric circuits for effecting automatic operation will be described in conjunction with a consideration of Fig. 3. With the parts in the initial position illustrated in Figs. 1 and 2 the sides of the passageway 19 are defined by a pair of substantially vertical plate-like means 30 and 31, the former of which functions as an animal-impelling member and to that end is suspended from a pivot rod 32 by arms 33 and 34. The other plate means 31 comprises a pair of spaced plate portions which are secured at their lower edges to a hinge rod 35 which is pivotally supported between the front and rear walls 12 and 13, whereby the plate portions are movable through the path indicated by the dot and dash arc, movement in a counter-clockwise direction being limited by stops 36. The space between the plate portions 31 accommodates the cord 25 and also certain other linkage, as will presently appear.

A third cooperating swinging assembly carries electrocuting means and comprises a pair of platform elements 38 carried by a frame 39 which has a hinge portion 40 pivotally supported against side wall 15. The platform elements 38 are spaced longitudinally in the same manner and for the same purpose as the plate portions 31.

The means 30 and 31 and the platform elements 38 are all connected for synchronous swinging movement. The pivot rod 32 has a crank 42 formed therein and the hinge portion 40 of the platform elements 38 has a crank 43 formed therein. A link 44 connects pivotally with the cranks 42 and 43 at its opposite ends. A second crank 46 is formed in the hinge portion 40 and a similar crank 47 is formed in the hinge rod 35, the cranks 46 and 47 being connected by a link 48.

The animal impelling element 30 is normally held in operative but preset position, that being the position indicated in full lines in the drawing, by spring-pressed detent pins 50 which engage seat elements 51 secured to the front and rear walls 12 and 13 of the device. By reason of the link connections 44 and 48 the detent 50, 51 normally retains all of the various swinging elements in their illustrated position.

The primary moving means for the swinging elements are electromagnets 53 and 54 whose armatures 55 and 56 move, respectively, to swing the animal impelling element 30 across the passageway 19 in opposite directions. The electromagnet 53 is energized to attract the armature 55 during an animal trap operation and the electromagnet 54 subsequently is energized to attract the armature 56 for resetting the trap.

Both of the armatures 55 and 56 are connected with a crank 58 formed on the pivot rod 32 by means of extension coil springs 60 and 61, respectively. The presence of the spring 60 permits the armature 55 to have a certain initial movement independently of the crank 58 whereby energy is stored in the spring 55 until the animal moving member 30 is freed from the detent 50, 51, thereby affording an increased moving force for more quickly overcoming the inertia of the several swinging parts and insuring a quick animal impelling movement of the member 30. The spring 60 stores energy at the beginning of the cycle, when the attractive force of the magnet has not reached maximum and the effect on the armature is low by reason of the relative remoteness of the latter. When the stored energy is sufficient to free the parts from the detent 50, 51 the stored energy plus the full force of the electromagnet move the element 30 swiftly across the passageway 19.

Simultaneously with this movement of the member 30, the plate means 31 moves to the right about its hinge rod 35 to a horizontal position where it forms in effect a continuation of the bottom wall 11. At the same time the platform elements 38 move downwardly to a position where they immediately overlie the plate portions 31. A pair of longitudinally spaced panels 64 are fixed to the frame 39 at such an angle that when the platform 38 has been lowered, the panels 64 and the animal impelling member 30, cooperate to form a confined space about the electrocuting platform 38.

Movement of the parts to the position just described automatically closes a circuit which energizes electrodes associated with the platform 38 in a manner which will presently appear, and such energization is maintained for a predetermined period of time, whereupon the electrocuting circuit is automatically broken and the various parts are simultaneously returned to their illustrated positions. This return movement projects the animal clear of the device through an opening 66, formed in one of the side walls 15. A horizontal panel member 67 confines the animal body for arcuate movement with the platform elements 38 during this phase of the operation. The return movement just alluded to is effected by energization of the electromagnet 54 and the electrical circuits for accomplishing the automatic mechanical operation described above will now be described.

The numerals 70 and 71 designate the conductors of a supply circuit for energizing the electromagnets 53 and 54 and the electrocution electrodes. One branch circuit 72 includes in series the electromagnet 53 and the primary winding of a transformer designated generally 73. The secondary winding of the transformer 73 is in circuit with a pair of electrodes 74 and 75 which are bridged by an animal on the platform 38 for electrocution of the animal. The branch circuit 72 has a shunt circuit 76 which includes the switch 27 which initiates trap operation and the switch 27 is adapted to initially close a circuit through the electromagnet 53 and the transformer 73. Such closure likewise energizes a holding coil 77, the core of which attracts and closes a switch 78 in the circuit 72 proper, whereby the circuit 72 is closed and remains closed even though the closure of the switch 27 is momentary.

The circuit 72 thus remains closed until it is opened by operation of a thermal time-delay switch 80. The switch 80 is designed to permit the circuit 72 to remain closed a sufficient length of time to insure electrocution of the animal. When the time-delay switch 80 opens, the holding coil 77 is deenergized and a spring 81 automatically opens the switch 78 and simultaneously closes a switch 82 which is disposed in a circuit 83 which includes and energizes the winding of the electromagnet 54. This quickly and forcibly restores the parts to their illustrated position, where they are detained by the detent 50, 51.

To deenergize the entire device during periods between trapping operations, the circuit 83 includes a switch 84 which is biased to closed position but is forcibly opened by movement of the arms 33, 34 to their illustrated position.

I claim:

1. An animal trap comprising a casing and a passageway therethrough, a member movable across said passageway to impel an animal to a position adjacent said passageway, an electrocuting platform movable to a position adjacent said passageway for receiving an animal body thereon, common operating means for simultaneously moving said member and said platform to impel and receive an animal respectively, and time delay means for returning said member to initial position and for simultaneously moving said platform to discharge an electrocuted animal therefrom.

2. An animal trap comprising a casing and a passageway therethrough, a member movable across said passageway to impel an animal to a position adjacent said passageway, an electrocuting platform movable to a position adjacent said passageway for receiving an animal body thereon, electromotive means for simultaneously moving said member and said platform to impel and receive an animal respectively, an operating circuit for said electromotive means and means for closing said circuit by and upon presence of an animal in said passageway, and time delay means for returning said member to initial position and for simultaneously moving said platform to discharge an electrocuted animal therefrom.

3. An animal trap comprising a casing and a passageway therethrough, a member movable across said passageway to impel an animal to a position adjacent said passageway, an electrocuting platform movable to a position adjacent said passageway and adjacent the bottom of said casing for receiving an animal body thereon, common operating means for simultaneously moving said member and said platform to impel and receive an animal respectively, and time delay means for returning said member to initial position and for simultaneously moving said platform away from said passageway to discharge an electrocuted animal therefrom.

4. An animal trap comprising a casing and a passageway therethrough, a member movable across said passageway to impel an animal to a position adjacent said passageway, an electrocuting platform movable to a position adjacent said passageway for receiving an animal body thereon, common operating means for simultaneously moving said member and said platform to impel and receive an animal respectively, time delay means for returning said member to initial position and for simultaneously moving said platform to discharge an electrocuted animal therefrom, means extending across said passageway and engageable by an animal traversing the passageway, and electrical means for actuating said common operating means, said electrical means being rendered effective by displacement of the means extending across the passageway.

5. An animal trap comprising a casing and a passageway therethrough, a pair of members defining opposite side walls of said passageway, one of said members being movable across the passageway toward the other in a trapping operation, said other member being mounted for pivotal movement adjacent its lower portion and being connected with the first-mentioned member whereby trapping movement of the first-mentioned member causes said other member to fall pivotally away from its wall defining position, and an electrocuting platform mounted for downward movement simultaneously with the trapping movement of said first-mentioned member to overlie said other member and receive an animal trapped by said first-mentioned member.

6. An animal trap comprising a casing and a passageway therethrough, a pair of members defining opposite side walls of said passageway, one of said members being movable across the passageway toward the other in a trapping operation, said other member being mounted for pivotal movement adjacent its lower portion and being connected with the first-mentioned member whereby trapping movement of the first-mentioned member causes said other member to fall pivotally away from its wall defining position, and an electrocuting platform movable simultaneously with the trapping movement of said first-mentioned member to overlie said other member and receive an animal trapped by said first-mentioned member.

7. An animal trap comprising a casing and a passageway therethrough, a pair of members defining opposite side walls of said passageway, one of said members being movable across the passageway toward the other in a trapping operation, said other member being mounted for pivotal movement adjacent its lower portion and being connected with the first-mentioned member whereby trapping movement of the first-mentioned member causes said other member to fall pivotally away from its wall defining position, an electrocuting platform movable simultaneously with the trapping movement of said first-mentioned member to overlie said other member and receive an animal trapped by said first-mentioned member, and time delay means for simultaneously restoring both members and said platform to initial pre-set position.

8. An animal trap comprising a casing and a passageway therethrough, a pair of members defining opposite side walls of said passageway, one of said members being movable across the passageway toward the other in a trapping operation, said other member being mounted for pivotal movement adjacent its lower portion and being connected with the first-mentioned member whereby trapping movement of the first-mentioned member causes said other member to fall pivotally away from its wall defining position, an electrocuting platform movable simultaneously with the trapping movement of said first-mentioned member to overlie said other member and receive an animal trapped by said first-mentioned member, and time delay means for simultaneously restoring both members and said platform to initial pre-set position, said platform being arranged to discharge an animal body disposed thereon by and upon restoring movement thereof.

9. An animal trap comprising a casing and a passageway therethrough, a pair of members defining opposite side walls of said passageway, one of said members being movable across the passageway toward the other member in a trapping operation, said other member being connected for simultaneous movement away from its wall defining position to permit movement of an animal from said passageway by said first member, an electrocuting platform movable to a position adjacent said passageway for receiving an animal body thereon, and common operating means whereby said platform is moved to animal receiving position simultaneously with movement of said first member to move an animal from said passageway.

10. An animal trap comprising a casing and a passageway therethrough, a pair of members defining opposite side walls of said passageways, one of said members being movable across the passageway toward the other member in a trapping operation, said other member being connected for simultaneous movement away from its wall defining position to permit movement of an animal from said passageway by said first member, an electrocuting platform movable to a position adjacent said passageway for receiving an animal body thereon, and common operating means whereby said platform is moved to animal receiving position simultaneously with movement of said first member to move an animal from said passageway, and time delay means for simultaneously restoring both members and said platform to initial pre-set position.

11. An animal trap comprising a casing and a passageway therethrough, a pair of members defining opposite side walls of said passageway, one of said members being movable across the passageway toward the other member in a trapping operation, said other member being connected for simultaneous movement away from its wall defining position to permit movement of an animal from said passageway by said first member, an electrocuting platform movable to a position adjacent said passageway for receiving an animal body thereon, and common operating means whereby said platform is moved to animal receiving position simultaneously with movement of said first member to move an animal from said passageway, and time delay means for simultaneously restoring both members and said platform to initial pre-set position, said platform being arranged to discharge an animal body disposed thereon by and upon restoring movement thereof.

12. An animal trap comprising a casing and a passageway therethrough, a pair of members defining opposite side walls of said passageway, one of said members being movable across the passageway toward the other in a trapping operation, said other member being mounted for pivotal movement adjacent its lower portion to fall pivotally away from its wall defining position, an electrocuting platform movable simultaneously with said other member to overlie said other member and receive an animal trapped by said first member, and time delay means for simultaneously restoring both members and said platform to initial pre-set position.

CHESTER W. CRUMRINE.